US00RE48081E

(19) United States
(12) Reissued Patent
Donohue

(10) Patent Number: US RE48,081 E
(45) Date of Reissued Patent: Jul. 7, 2020

(54) VENTURI VALVE AND CONTROL SYSTEM

(71) Applicant: Kieran L. Donohue, River Hills, WI (US)

(72) Inventor: Kieran L. Donohue, River Hills, WI (US)

(21) Appl. No.: 15/692,195

(22) Filed: Aug. 31, 2017

Related U.S. Patent Documents

Reissue of:
(64) Patent No.: 9,255,721
Issued: Feb. 9, 2016
Appl. No.: 13/415,690
Filed: Mar. 8, 2012

(51) Int. Cl.
*F16K 31/12* (2006.01)
*F24F 11/74* (2018.01)
*F24F 11/00* (2018.01)
*F24F 110/40* (2018.01)

(52) U.S. Cl.
CPC ..... *F24F 11/74* (2018.01); *F24F 2110/40* (2018.01); *Y10T 137/7789* (2015.04)

(58) Field of Classification Search
CPC ..... F24F 11/74; F24F 2110/40; F24F 11/04; F24F 2011/0042; Y10T 137/7789; G01F 1/36; G01F 1/40; G01F 1/44; G01F 1/46
See application file for complete search history.

(56) References Cited

U.S. PATENT DOCUMENTS 1,673,041 A * 6/1928 Connet et al. ..... 137/502
2,734,443 A * 2/1956 Wood ..... 454/71
3,733,901 A * 5/1973 Halmi ..... G01F 1/44 138/44
3,945,565 A 3/1976 Lynch et al.
4,481,828 A * 11/1984 Cheng ..... 73/861.63
5,184,501 A 2/1993 Lewis et al.
5,240,455 A 8/1993 Sharp
5,251,665 A 10/1993 Schaufeld
5,304,093 A 4/1994 Sharp et al.
5,385,505 A 1/1995 Sharp et al.
5,435,779 A 7/1995 Sharp et al.
5,545,086 A 8/1996 Sharp et al.
5,586,861 A * 12/1996 Berger ..... 415/118
5,720,658 A 2/1998 Belusa ..... F24F 11/70 454/238

(Continued)

OTHER PUBLICATIONS

Phoenix Controls; "Medium-Pressure Accel II Venturi Valves: Constant Volume, Two-Position and Base Upgradable;" 2001; pp. 1-4; Acton, MA.
Phoenix Controls; "Medium-Pressure Accel II Venturi Valves: Analog;" 1999; pp. 1-4; Acton, MA.
Phoenix Controls; "Medium-Pressure Accel II Valves Celeris;" 2001; pp. 1-6; Acton, MA.

(Continued)

*Primary Examiner* — Catherine S Williams
(74) *Attorney, Agent, or Firm* — Donald J. Ersler

(57) ABSTRACT

Embodiments of the invention provide a venturi valve and control system for use in an indoor environment to regulate air flow. The venturi valve includes a substantially cylindrical pipe, a high pressure sensing assembly, a low pressure sensing assembly, a differential pressure transducer, and a damper assembly. The high pressure sensing assembly and the low pressure sensing assembly do not substantially impede air flow through the valve. A controller is connected to the differential pressure transducer and a damper actuator. The controller determines a current flow rate of air into the indoor environment and operates the damper actuator in order to provide a desired flow rate of air into the indoor environment.

13 Claims, 15 Drawing Sheets

(56) References Cited

U.S. PATENT DOCUMENTS

| | | | | |
|---|---|---|---|---|
| 6,125,710 | A | 10/2000 | Sharp | |
| 7,131,398 | B2 * | 11/2006 | Cohen | A01K 1/031 119/455 |
| 7,299,707 | B1 | 11/2007 | Evans | |
| 7,543,595 | B2 | 6/2009 | Jacob et al. | |
| 7,594,428 | B2 * | 9/2009 | Titterton et al. | 73/54.04 |
| 7,677,464 | B1 | 3/2010 | Donohue | |
| 7,701,329 | B2 | 4/2010 | Donohue | |
| 7,798,018 | B2 * | 9/2010 | Rombach et al. | G01F 1/46 73/861.65 |
| 8,061,219 | B2 | 11/2011 | Rezgui et al. | |
| 8,068,021 | B1 | 11/2011 | Donohue | |

OTHER PUBLICATIONS

Phoenix Controls; "Medium-Pressure Accel II Venturi Valves: Overview;" 2001; pp. 1-4; Acton, MA.
Phoenix Controls; "Products—Valves;" 2012; pp. 1-3; phoenixcontrols.com.
Phoenix Controls; "Products—Controllers;" 2012; pp. 3; phoenixcontrols.com.
Phoenix Controls; "Accel II Airflow Control Valves;" 2008; pp. 1-2; USA.
Phoenix Controls; "Accel II Airflow Control Valves Pressure Independence;" 2008; pp. 1-2; USA.
ANEMOSTAT; "Model XAFT Exhaust Valves;" pp. E3-E4.
ANEMOSTAT; "Model XAFT Flow Sensors;" pp. E5, E17.
ANEMOSTAT; "Controls & Features;" pp. A-3-A-10.
ANEMOSTAT; "Applied Environmental Diffusers;" p. 1.

* cited by examiner

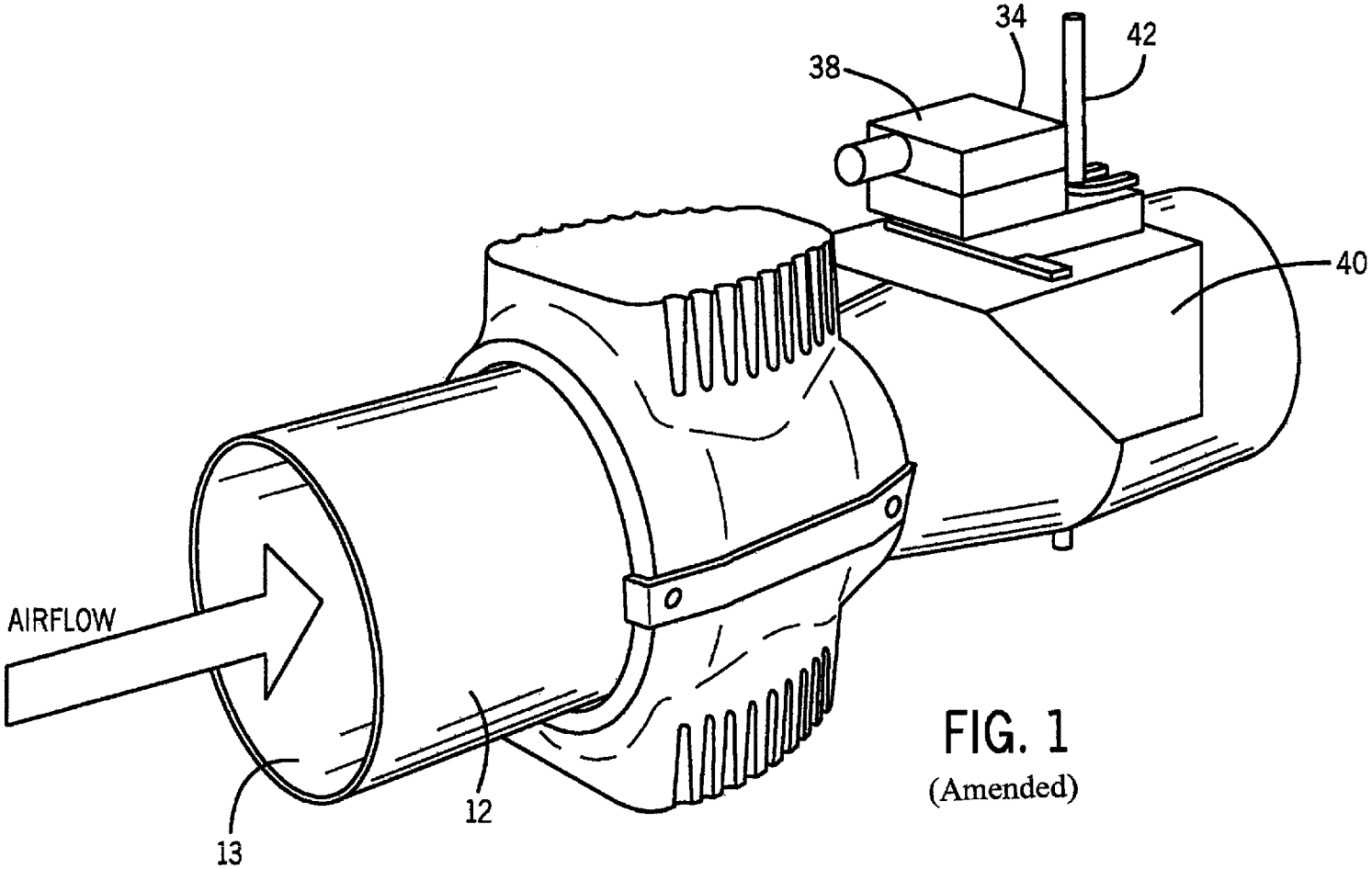
FIG. 1
(Amended)

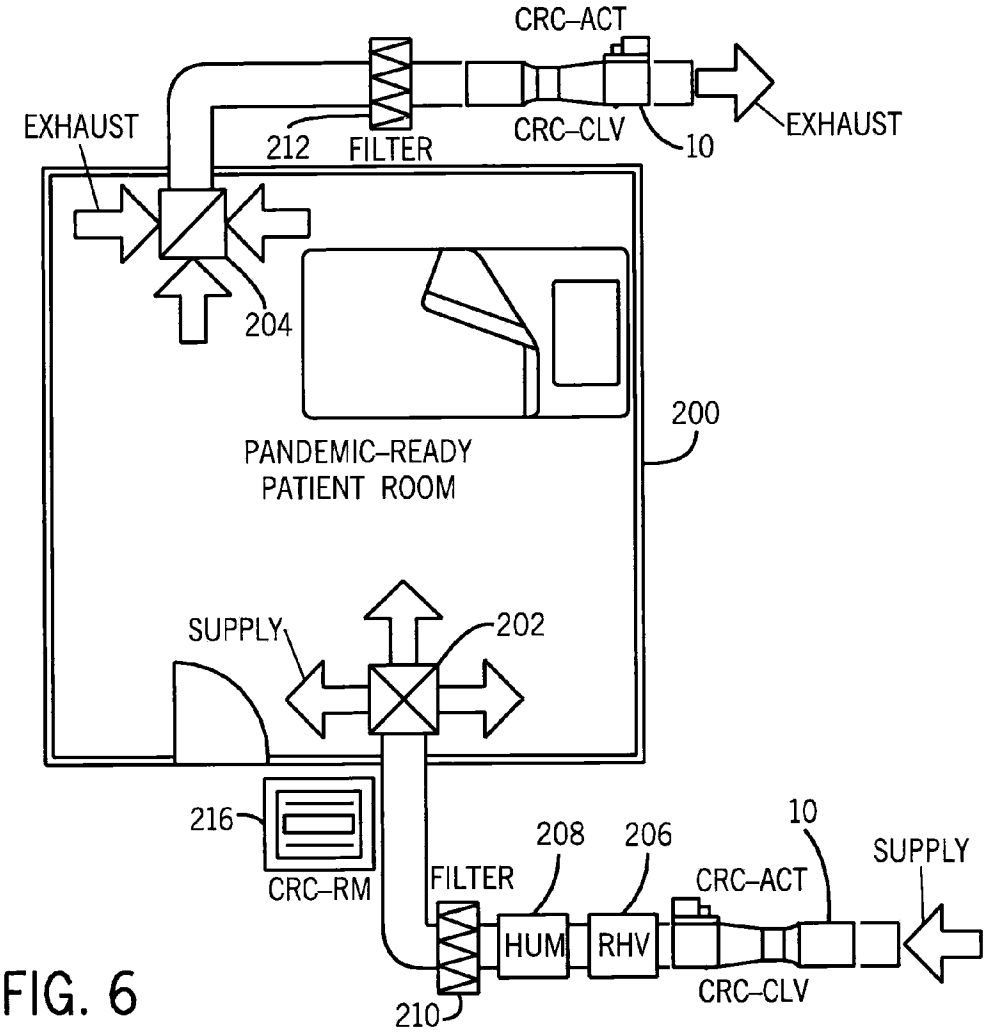
FIG. 6
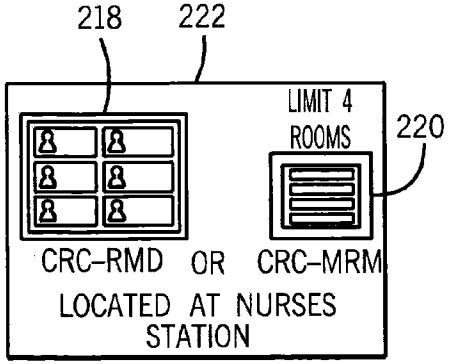

VENTURI VALVE AND CONTROL SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

There are many applications where a valve is provided in an air flow path to control the flow of the air, for example, in the ducting of an indoor critical environment (hospitals, laboratories, etc.) or in the ducting of an indoor non-critical environment (classrooms, conference rooms, etc.). Some conventional valves include an air flow station in the form of a cross flow sensor that includes two cross bars to measure total pressure and static pressure in order to determine the velocity pressure inside the valve. The velocity pressure is used to calculate the current air flow rate, and a damper inside the valve is rotated to provide the desired air flow rate.

Other conventional valves include a mechanical air regulator in the form of a cone-shaped element positioned in and movable in the valve's orifice. The cone-shaped element varies the size of an annular-shaped fluid flow path formed in the orifice. Due to the shape of the cone and the orifice, the pressure drop across the valve's orifice can be measured by the force exerted on the cone by the difference between the static pressure directly in front of and behind the cone caused by the increased air velocity behind the cone. The valve uses this force to act upon a variable rate spring located inside the cone, which connects the cone to the valve's shaft. The purpose of the spring is to provide a pressure-compensating action so that for a given position of the valve's shaft, the flow rate of the valve is constant or independent of pressure changes over some range of pressure drops across the valve. However, the actual air flow rate is derived from the position of the valve's shaft, not from sensor measurements of the static pressure in front of and behind the cone.

In both of these conventional configurations there is an air flow station or mechanical air regulator positioned inside the valve's orifice that interferes with a significant portion of the cross-sectional area available for air flow. When the air flow station or mechanical air regulator interferes with air flow, the air flow station and even the valve itself can become clogged with debris. In addition, both the cross flow sensor and the cone-spring configurations must be calibrated properly in order to accurately determine the actual air flow rate. If these devices are no longer calibrated properly, the valve must be accessed within the walls of the building to recalibrate it.

SUMMARY

In light of the problems set forth above, there is a need for a valve for use in indoor environments that does not include an air flow station or mechanical air regulator that interferes with air flow.

Some embodiments of the invention provide a venturi valve for use in an indoor environment to regulate air flow. The venturi valve can include a substantially cylindrical pipe including a first section having a first diameter and a second section having a second diameter, with the first diameter being larger than the second diameter. The venturi valve can include a high pressure sensing assembly with a first pneumatic tube positioned around the first diameter. The first pneumatic tube can be coupled to several air inlet ports. The air inlet ports can be spaced around the first diameter to sense a first average static pressure at the first diameter. The venturi valve can include a low pressure sensing assembly with a second pneumatic tube positioned around the second diameter. The second pneumatic tube can also be coupled to several air inlet ports. The air inlet ports can be spaced around the second diameter to sense a second average static pressure at the second diameter.

The venturi valve can also include a differential pressure transducer coupled to the high pressure sensing assembly and the low pressure sensing assembly. The differential pressure transducer can generate a differential pressure signal based on the first average static pressure and the second average static pressure. In addition, the venturi valve can include a damper assembly coupled to the substantially cylindrical pipe. The damper assembly can include a damper and a damper actuator. A controller can be connected to the differential pressure transducer and the damper actuator. The controller can determine a current flow rate of air into the indoor environment based on a differential pressure signal. The controller can operate the damper actuator based on the current flow rate in order to provide a desired flow rate of air into the indoor environment.

Embodiments of the invention also provide a system for controlling air flow through an indoor environment including a supply duct and an exhaust duct. The system can include a first venturi valve adapted to be coupled to the supply duct. The first venturi valve includes a first differential pressure transducer to generate a first differential pressure signal. The first venturi valve is capable of measuring air flow in the supply duct without substantially impeding air flow. The system also includes a second venturi valve adapted to be coupled to the exhaust duct. The second venturi valve includes a second differential pressure transducer to generate a second differential pressure signal. The second venturi valve is capable of measuring air flow in the exhaust duct without substantially impeding air flow. The system further includes a room monitor connected to the first differential pressure transducer and the second differential pressure transducer and a room management display connected to the room monitor.

DESCRIPTION OF THE DRAWINGS

FIG. 1 is a perspective view of a venturi valve according to one embodiment of the invention.

FIG. 6 is a schematic illustration of the venturi valve of FIG. 1 for use in a pandemic-ready patient room.

DETAILED DESCRIPTION

Figure 2:
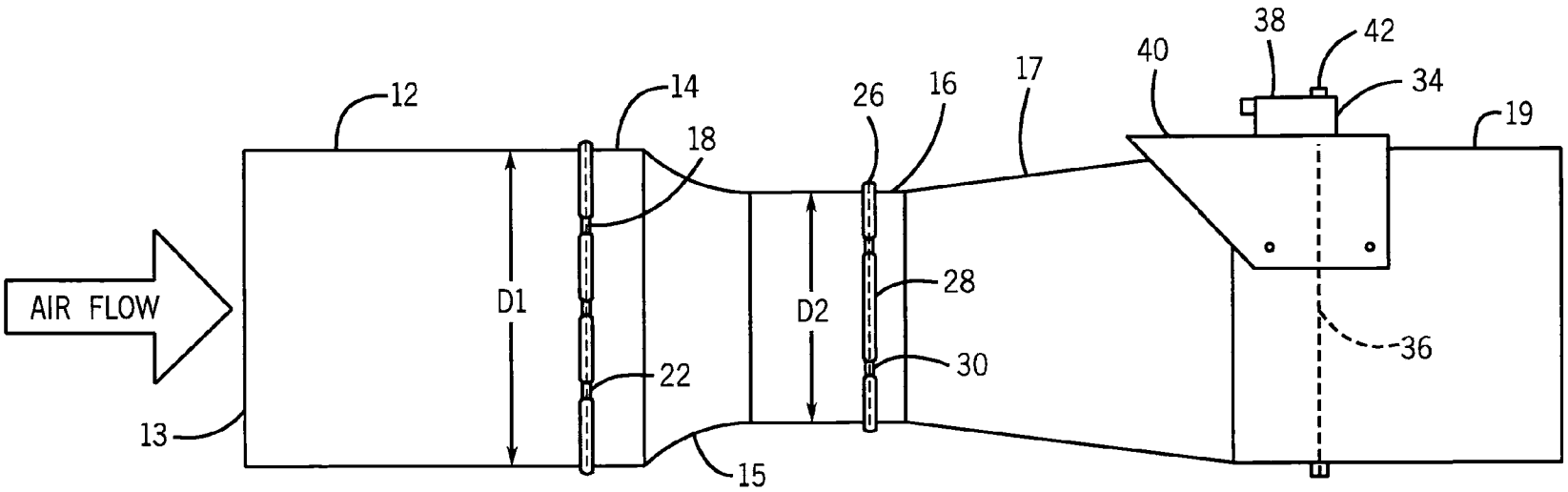
FIG. 2 is a side view of the venturi valve of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a venturi valve 10 according to one embodiment of the invention. The venturi valve 10 can be used in an indoor environment, such as a critical or non-critical environment, to regulate air flow. For example, the venturi valve 10 can be used in critical environments such as a health care facility, a patient room, an isolation room, a procedure room, a pharmacy, an oncology room, a laboratory, an operating room, a research facility, a wet chemistry laboratory, a bio-containment room, a clean room, a life science facility, a vivarium, an open bench laboratory. The venturi valve 10 can also be used in non-critical environments such as a commercial space, an office space, a data room, a conference room, a government facility, a university space, a classroom, and a lecture hall.

As shown in FIG. 2, the venturi valve 10 includes a substantially cylindrical pipe 12 with a venturi inlet 13, a first section 14 having a first diameter D1, and a second section 16 having a second diameter D2. The first diameter D1 is larger than the second diameter D2. As also shown in FIG. 2, the pipe 12 can include additional sections having varying diameters between the first diameter D1 and the second diameter D2. For example, the pipe 12 can include a reducing diameter at a third section 15 and a gradually increasing diameter at a fourth section 17. In some embodiments, the diameter at a fifth section 19 downstream of the fourth section 17 can be substantially equal to the first diameter D1. In one embodiment, the pipe 12 can be constructed of 0.080" aluminum or 0.040" stainless steel.

Figure 4:
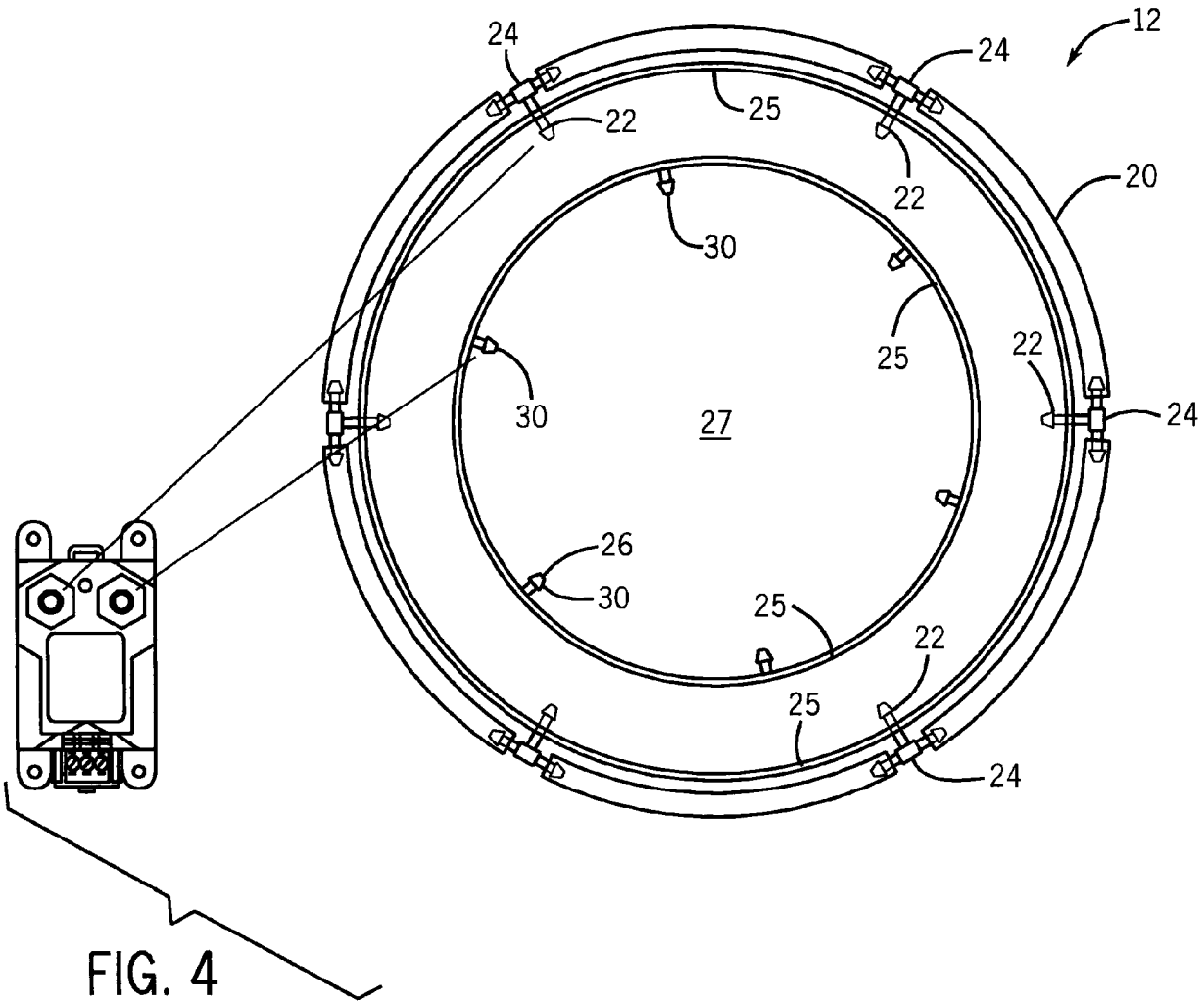
FIG. 4 is an end view of the venturi valve of FIG. 1.

The venturi valve 10 includes a high pressure sensing assembly 18 with a first pneumatic tube 20 positioned around the first diameter D1. As shown in FIG. 4, the first pneumatic tube 20 is coupled to several air inlet ports 22. The air inlet ports 22 can include T-shaped connectors 24 in order to connect several segments together to make up the pneumatic tube 20 extending around the first diameter D1. The air inlet ports 22 are spaced (e.g., equally spaced) around the first diameter D1 in order to sense a first average static pressure at the first diameter D1. In some embodiments, at least six air inlet ports 22 are positioned around the first diameter D1. As shown in FIG. 4, the air inlet ports 22 are coupled to an internal surface 25 of the pipe 12. The air inlet ports 22 extend only minimally into an internal portion 27 of the pipe 12 in order to not interfere with air flow. In some embodiments, the air inlet ports 22 do not extend into the internal portion 27 of the pipe 12, but rather are surface flush with the pipe 12. In other embodiments, the air inlet ports 22 can extend about one-quarter of an inch, about one-eighth of an inch, or up to about two inches into the internal portion 27 of the pipe 12. In this manner, the air inlet ports 22 do not block the pipe 12 so that they are non-obstructive across the duct created by the pipe 12 and include no moving parts in the air stream. In other words, the air inlet ports 22 do not substantially impede air flow through the pipe 12 or bisect the pipe 12. As a result of there being no moving parts, the venturi valve 10 can be installed in any orientation as dictated by field requirements. In addition, there are no critical components located in the air stream.

The venturi valve 10 also includes a low pressure sensing assembly 26 including a second pneumatic tube 28 positioned around the second diameter D2. The second pneumatic tube 28 is coupled to several air inlet ports 30. The air inlet ports 30 are spaced around the second diameter D2 to sense a second average static pressure at the second diameter D2. In some embodiments, at least six air inlet ports 30 are positioned around the second diameter D2. The air inlet ports 30 can include T-shaped connectors in order to connect several segments together to make up the pneumatic tube 28 extending around the second diameter D2. The air inlet ports 30 are spaced (e.g., equally spaced) around the second diameter D2 in order to sense a second average static pressure at the second diameter D2.

Figure 3:
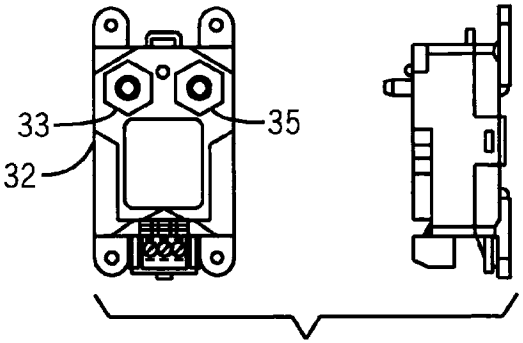
FIG. 3 is a front view of a differential pressure transducer of the venturi valve of FIG. 1.

As shown in FIG. 3, the venturi valve 10 can be incorporated with a differential pressure transducer 32 that is coupled to the high pressure sensing assembly 18 and the low pressure sensing assembly 26. The differential pressure transducer 32 can include a high pressure connector 33 connected to the high pressure sensing assembly 18 and a low pressure connector 35 connected to the low pressure sensing assembly 26. The differential pressure transducer 32 can generate a differential pressure signal based on the first average static pressure and the second average static pressure. The venturi valve 10 can measure the differential pressure across the venturi created by the pipe 12 having a first diameter D1 and a second smaller diameter D2. In one embodiment, the differential pressure transducer 32 can be an ultra-low direct differential pressure transmitter with dead end technology incorporating a Si-Glas variable capacitance sensor and digital compensation with an application specific integrated circuit (ASIC). The differential pressure transducer 32 can include a diaphragm constructed of silicon without glues or organics that contribute to drift over time. The differential pressure transducer 32 can have an accuracy of 0.4% full scale. The differential pressure transducer 32 can include an integral LED light that increases intensity as the differential pressure increases.

As shown in FIG. 1, the differential pressure transducer 32, the high pressure sensing assembly 18, and the low pressure sensing assembly 26 can be surrounded by a cover 33. The cover 33 can include a two-piece housing and can incorporate a heat sink, in some embodiments.

As shown in FIGS. 1 and 2, the venturi valve 10 can be incorporated with a damper assembly 34 coupled to pipe 12. The damper assembly 34 can include a rotatable damper panel 36 (or a non-rotatable damper) and a damper actuator 38. The damper assembly 34 can be coupled to the pipe 12 using an actuator mounting bracket 40. The damper assembly 34 can include a damper shaft 42 coupled between the damper actuator 38 and the rotatable damper panel 36. When the damper actuator 38 rotates the damper shaft 42, the damper panel 36 rotates within the pipe 12 in order to alter the open area of the pipe 12 to either allow more air flow or less air flow. The damper assembly 34 can be low leakage and rated for less than one percent of maximum rated flow at 3" WC inlet static pressure. The damper assembly 34 can include self-lubricating Teflon bearings. The damper shaft 42 can be solid steel.

In one embodiment, the damper actuator 38 is microprocessor based with conditioned feedback and uses brushless DC technology. In one embodiment, the damper actuator 38 delivers a minimum of 35 inch-pounds or 5.6 Newton meters of torque rated voltage and can be set for a 2 to 10 VDC signal and field wired for 4 to 20 mA. In some embodiments, the damper actuator 38 can include an external clutch for manual adjustments. In some embodiments, the damper actuator 38 can include a position indicator and a control signal that is fully programmable. The venturi valve 10 and the damper actuator 38 can be configured for fail-safe operation during a loss of power.

The venturi valve 10 can be connected to one or more controllers, such as room monitors 116-1116 (as further described herein) or various other types of controllers and monitors. The controller can be connected to the differential pressure transducer 32 and the damper actuator 38. The controller can determine a velocity pressure based on the differential pressure signal from the differential pressure transducer 32. The controller can determine a current flow rate of air into the critical or non-critical environment based on the velocity pressure and a constant K. The square root of the differential pressure measured across the venturi is multiplied by a constant K to derive an air flow rate in cubic feet per minute (CFM). The controller can operate the damper actuator 38 based on the current flow rate in order to provide a desired flow rate of air into the critical or non-critical environment.

The venturi valve 10 control strategy can be a closed loop system that utilizes direct flow measurement. The air flow feedback is sent to the controller where it is compared to the desired system air flow set point. The controller compares actual measured flow with the air flow set point and generates an error representing the difference between the measured air flow and the desired air flow. The control loop responds to the system error by adjusting the damper panel 36. In some embodiments, the controller uses proportional-integral-derivative (PID) closed loop control.

Figure 5:
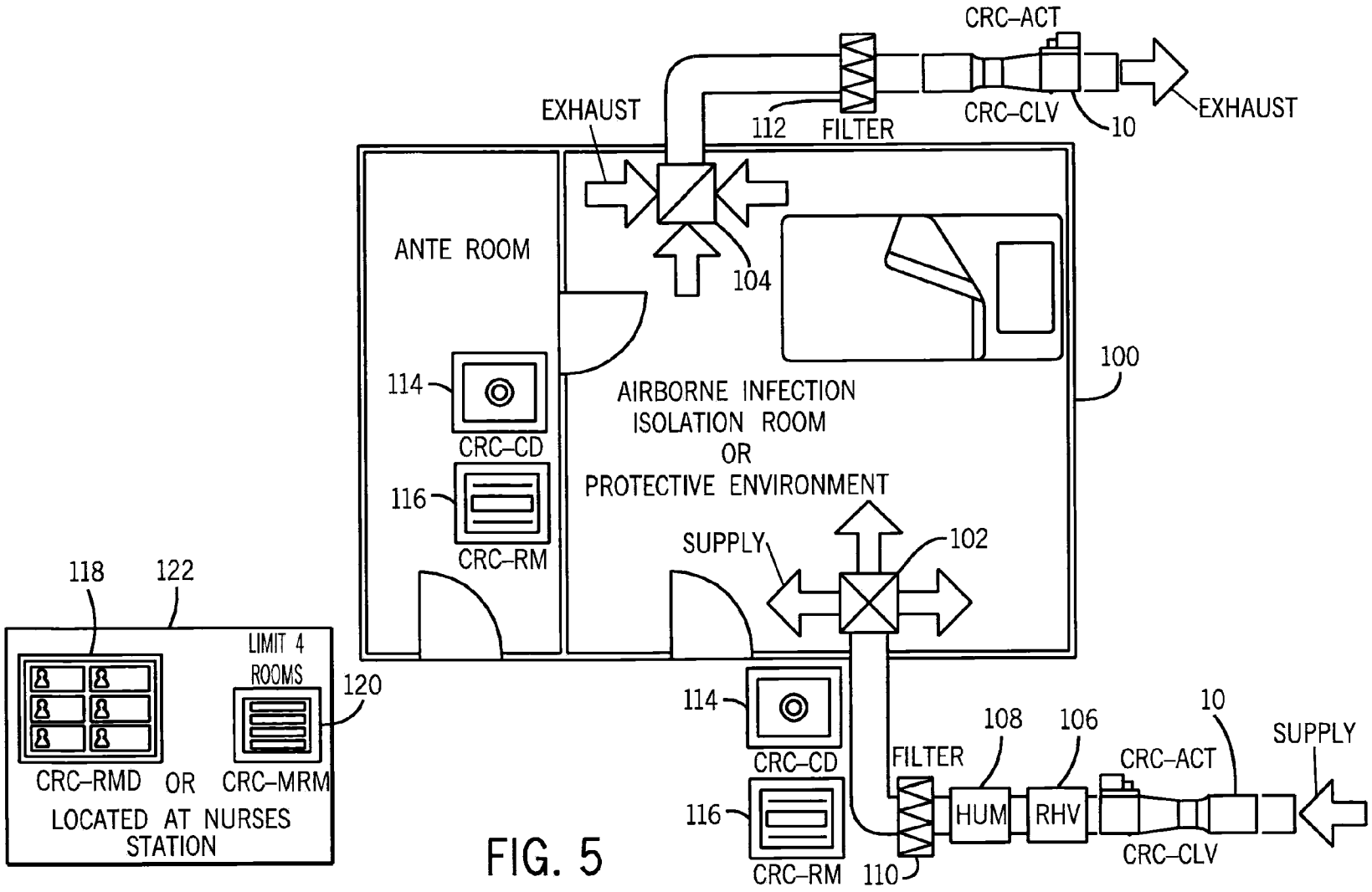
FIG. 5 is a schematic illustration of the venturi valve of FIG. 1 for use in an airborne infection isolation room.

FIG. 5 is a schematic illustration of the venturi valve 10 of FIG. 1 for use in an airborne infection isolation room 100. The airborne infection isolation room 100 includes a supply duct 102 and an exhaust duct 104. The venturi valve 10 can also be used in return ducts and bypass ducts. A first venturi valve 10 can be positioned in the supply duct 102 along with a reheat valve 106, a humidity sensor 108, and a first filter 110. A second venturi valve 10 can be positioned in the exhaust duct 104 along with a second filter 112. The airborne infection isolation room 100 can be equipped with room condition displays 114 and room monitors 116, which can be in communication with a room management display 118 or a multi-room monitor 120, for example located at a nurses' station 122.

In one embodiment, the reheat valve 106 can have a fixed range of 1000 ohms, an input voltage of 10.5-45 VDC, and an output of 4-20 mA. In one embodiment, the humidity sensor 108 can be an ultra fast response polymer capacitance sensor that is not affected by condensation, fog, high humidity, or contaminants. In one embodiment, the humidity sensor 108 can have a range 0-100% with an accuracy of about ±2%/±3% and a hysteresis of about ±1%.

In some embodiments, a room static pressure transmitter can be mounted to the ceiling or a wall in the room in which the venturi valve 10 is used. The room static pressure transmitter can include a sintered stainless steel muffler that filters out noise associated with air movements common with high air change rate applications. In some embodiments, a door contactor can be installed in the room in which the venturi valve 10 is used. The door contactor can include a hermetically-sealed magnetic reed switch.

In some embodiments, the filters 110, 112 can be duct mounted with integral, factory-mounted pressure controllers. The filters 110, 112 can be bag-in, bag-out type filters. A single filter housing can include an optional pre-filter and a high-capacity HEPA final filter. The filters 110, 112 can include glass fiber media and aluminum separators, along with filter cell sides that are constructed of galvanized plated steel and fire resistant wood. The filters 110, 112 can have an efficiency of at least about 99.97% when tested with thermally generated D.O.P. and can have an initial pressure drop of 1.44 inches W.G. at a rated air-flow of 1000 CFM per filter.

The filters 110, 112 can include a pre-filter unit with a premium extended surface type in 4 inch depth with an efficiency of about 25-30 percent for ASHRAE Standard 52-76 test method. The filters 110, 112 can be connected to a filter monitor for selecting and displaying filter loading parameters on the room monitor 116 and/or the room management display 118.

The room condition display 114 can include a TFT/VGA screen with programmable information indicating room status. The room condition display 114 can indicate status with a change in colored background and associated owner-selected messages and graphics. In one embodiment, the background color of the room condition display 114 for the isolation room 100 can indicate three distinct room conditions: (1) Infectious Room (Red/owner graphics and message); (2) Room being Cleared (Amber/owner graphics and message); and (3) Room Cleared (Green/owner graphics and message). The operation of the isolation room 100 can be separated into three modes: (1) "Infectious Condition—authorized personnel only" (room is in a negative or positive adjustable pressure relative to adjacent spaces); (2) "Room being Cleared—Do not enter" (room is in a negative or positive adjustable pressure relative to adjacent spaces); and (3) "Room Clear" (room pressure is neutral relative to adjacent spaces).

The room monitors 116 can be capable of measuring the differential pressure between two individual spaces at various locations. Each room can have its own room monitor 116 capable of stand-alone operation. Each room monitor 116 is capable of both visual and audible alarms. Each room monitor 116 uses direct pressure measurement with industrial quality differential pressure transducer technology. The room monitor 116 can use closed-loop control and can monitor the associated room condition display 114 and the room management display 118. The room monitor 116 can also monitor one or more of the following: a supply terminal, a supply terminal with reheat, an exhaust terminal, an exhaust unit, a room temperature sensor, a duct temperature sensor, a room humidity sensor, a duct humidity sensor, a door contactor, a HEPA filter unit, a pre-filter unit, and/or a filter monitor. The room monitor 116 can maintain a safe and comfortable negative/neutral or positive/neutral pressurized relative to the adjacent spaces.

The room management display 118 can be a complete management tool capable of displaying and accessing a single room or any combination of critical rooms. The room management display 118 can be an easy to navigate monitor for use in making adjustments to associated critical spaces. The room management display 118 can have custom graphic programming to meet any desired sequence of operation. In addition to programming, the room management display 118 can have hardware and software to support one or more of the following protocols: BACnet (ARC 156, MS/TP, and PTP), Modbus (RTU & ASCII), N@ Bus, and LonWorks (optional plug-in card used for Lon Works). The room management display 118 can also support BACnet/IP communications through an optional Ethernet Plug-on card, which can provide Internet pages to a standard Internet Browser package.

FIG. 6 is a schematic illustration of the venturi valve 10 of FIG. 1 for use in a pandemic-ready patient room 200. The pandemic-ready patient room 200 includes a supply duct 202 and an exhaust duct 204. A first venturi valve 10 can be positioned in the supply duct 202 along with a reheat valve 206, a humidity sensor 208, and a first filter 210. A second venturi valve 10 can be positioned in the exhaust duct 204 along with a second filter 212. The pandemic-ready patient room 200 can be equipped with a room monitor 216, which can be in communication with a room management display 218 or a multi-room monitor 220, for example located at a nurses' station 222.

Figure 7:
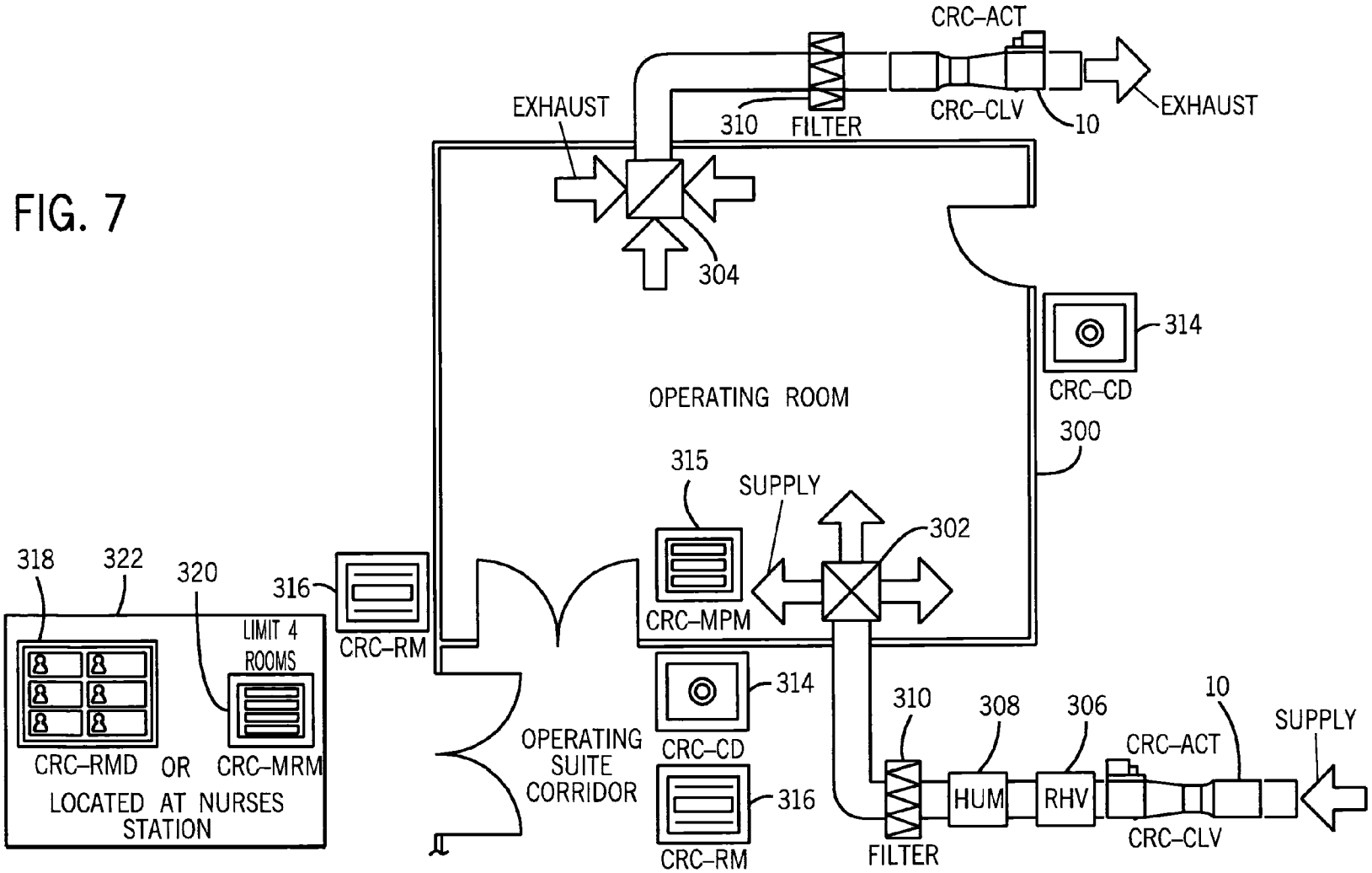
FIG. 7 is a schematic illustration of the venturi valve of FIG. 1 for use in an operating room.

FIG. 7 is a schematic illustration of the venturi valve 10 of FIG. 1 for use in an operating room 300. The operating room 300 includes a supply duct 302 and an exhaust duct 304. A first venturi valve 10 can be positioned in the supply duct 302 along with a reheat valve 306, a humidity sensor 308, and a first filter 310. A second venturi valve 10 can be positioned in the exhaust duct 304 along with a second filter 312. The operating room 300 can be equipped with room condition displays 314, a multi-point monitor 315, and room monitors 316, which can be in communication with a room management display 318 or a multi-room monitor 320, for example located at a nurses' station 322.

Figure 8:
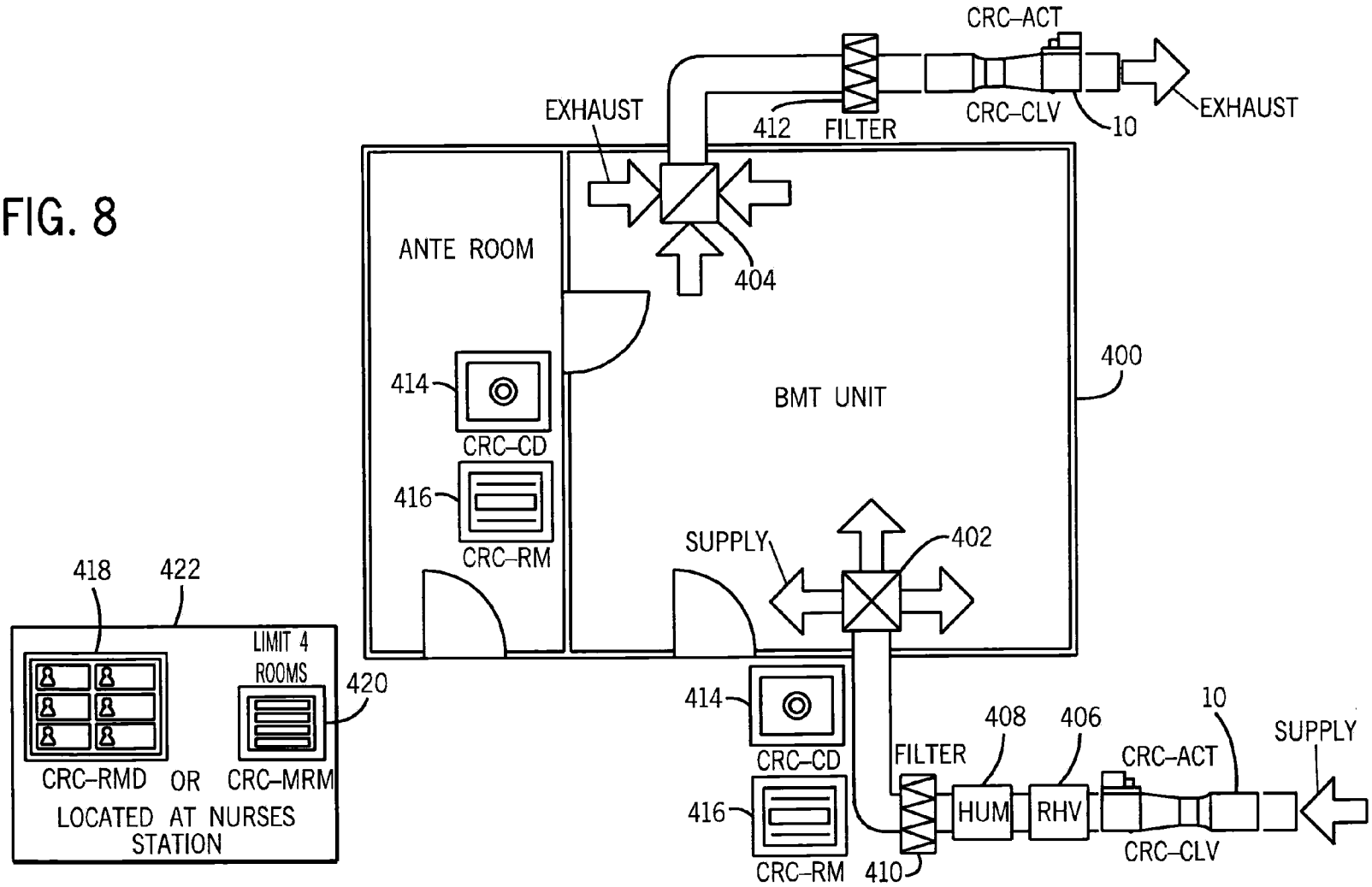
FIG. 8 a schematic illustration of the venturi valve of FIG. 1 for use in a bone marrow transplant unit.

FIG. 8 a schematic illustration of the venturi valve 10 of FIG. 1 for use in a bone marrow transplant unit. The bone marrow transplant unit 400 includes a supply duct 402 and an exhaust duct 404. A first venturi valve 10 can be positioned in the supply duct 402 along with a reheat valve 406, a humidity sensor 408, and a first filter 410. A second venturi valve 10 can be positioned in the exhaust duct 404 along with a second filter 412. The bone marrow transplant unit 400 can be equipped with room condition displays 414 and room monitors 416, which can be in communication with a room management display 418 or a multi-room monitor 420, for example located at a nurses' station 422.

Figure 9:
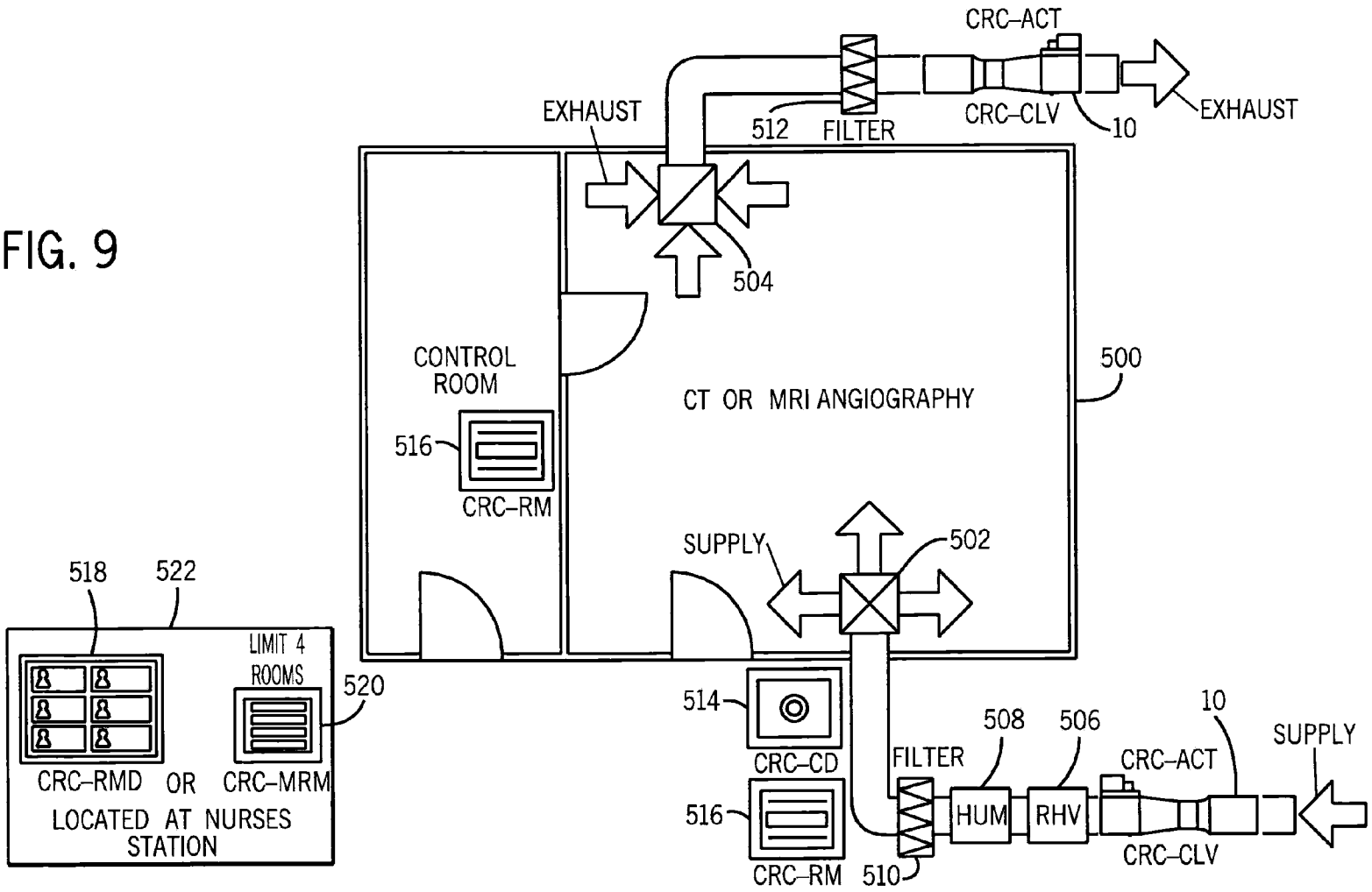
FIG. 9 is a schematic illustration of the venturi valve of FIG. 1 for use in a medical imaging room.

FIG. 9 is a schematic illustration of the venturi valve 10 of FIG. 1 for use in a medical imaging room 500 for use with CT, MRI, or angiography equipment. The medical imaging room 500 includes a supply duct 502 and an exhaust duct 504. A first venturi valve 10 can be positioned in the supply duct 502 along with a reheat valve 506, a humidity sensor 508, and a first filter 510. A second venturi valve 10 can be positioned in the exhaust duct 504 along with a second filter 512. The medical imaging room 500 can be equipped with a room condition display 514 and room monitors 516, which can be in communication with a room management display 518 or a multi-room monitor 520, for example located at a nurses' station 522.

Figure 10:
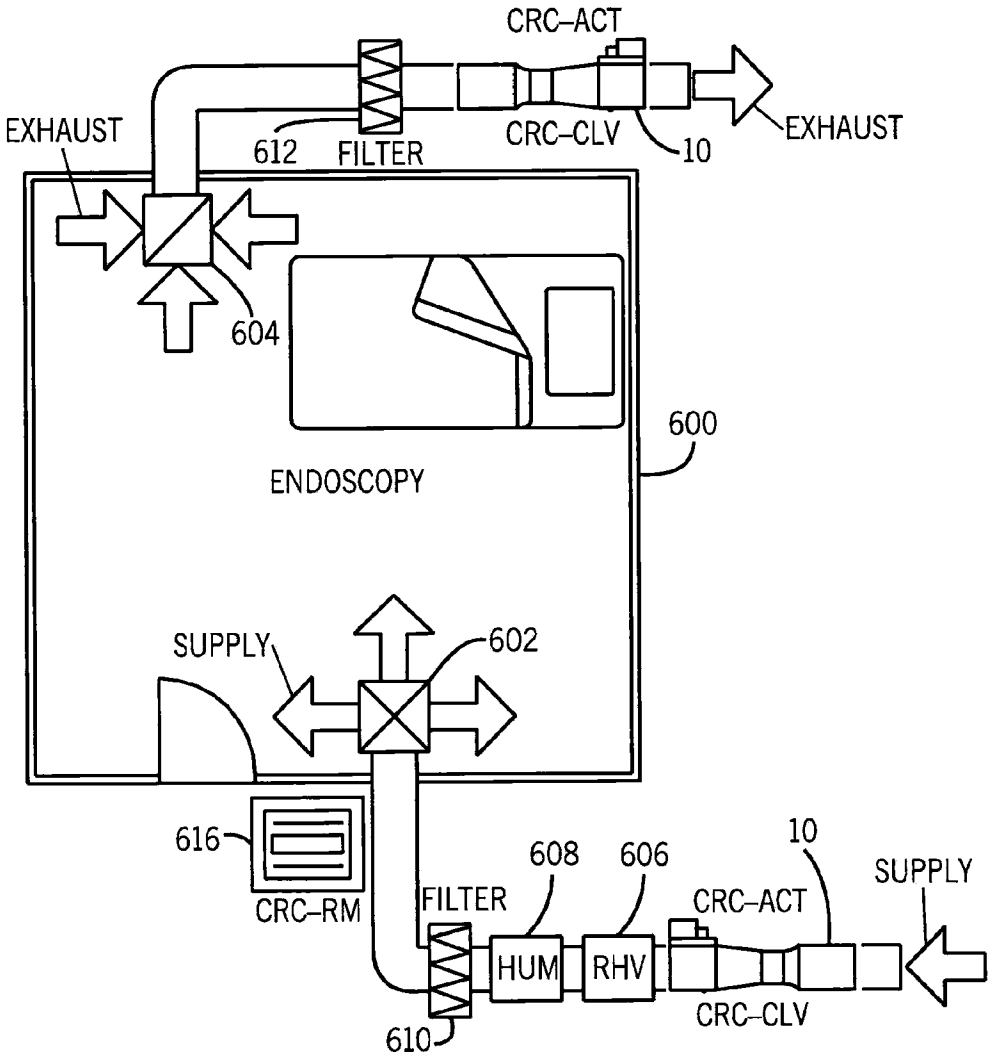
FIG. 10 is a schematic illustration of the venturi valve of FIG. 1 for use in an another medical imaging room.
Figure 10:
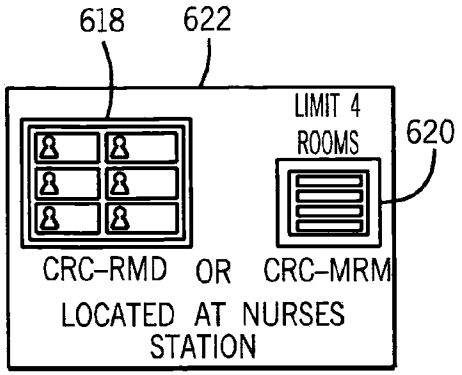

FIG. 10 is a schematic illustration of the venturi valve 10 of FIG. 1 for use in an anther medical imaging room 600 for use with endoscopy equipment. The medical imaging room 600 includes a supply duct 602 and an exhaust duct 604. A first venturi valve 10 can be positioned in the supply duct 602 along with a reheat valve 606, a humidity sensor 608, and a first filter 610. A second venturi valve 10 can be positioned in the exhaust duct 604 along with a second filter 612. The medical imaging room 600 can be equipped with a room monitor 616, which can be in communication with a room management display 618 or a multi-room monitor 620, for example located at a nurses' station 622.

Figure 11:
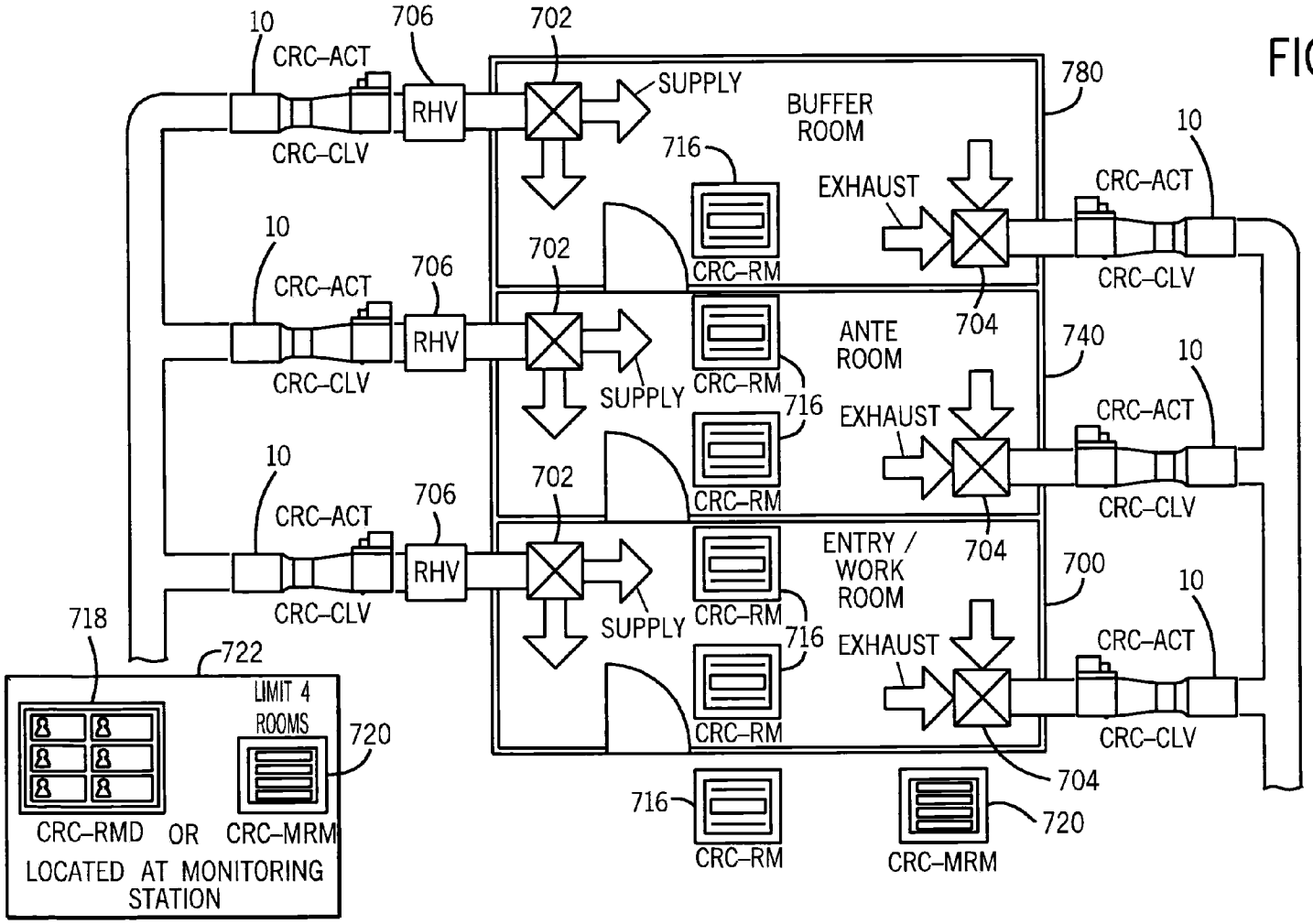
FIG. 11 is a schematic illustration of the venturi valve of FIG. 1 for use in a pharmacy or oncology/hematology room.

FIG. 11 is a schematic illustration of the venturi valve of FIG. 1 for use in pharmacy or oncology/hematology rooms 700, 740, 780. The pharmacy or oncology/hematology rooms 700, 740, 780 include supply ducts 702 and exhaust ducts 704. First venturi valves 10 can be positioned in the supply ducts 702 along with reheat valves 706. Second venturi valves 10 can be positioned in the exhaust ducts 704. The pharmacy or oncology/hematology rooms 700, 740, 780 can be equipped with room monitor 716, which can be in communication with a room management display 718 or multi-room monitors 720, for example located at a monitoring station 722.

Figure 12:
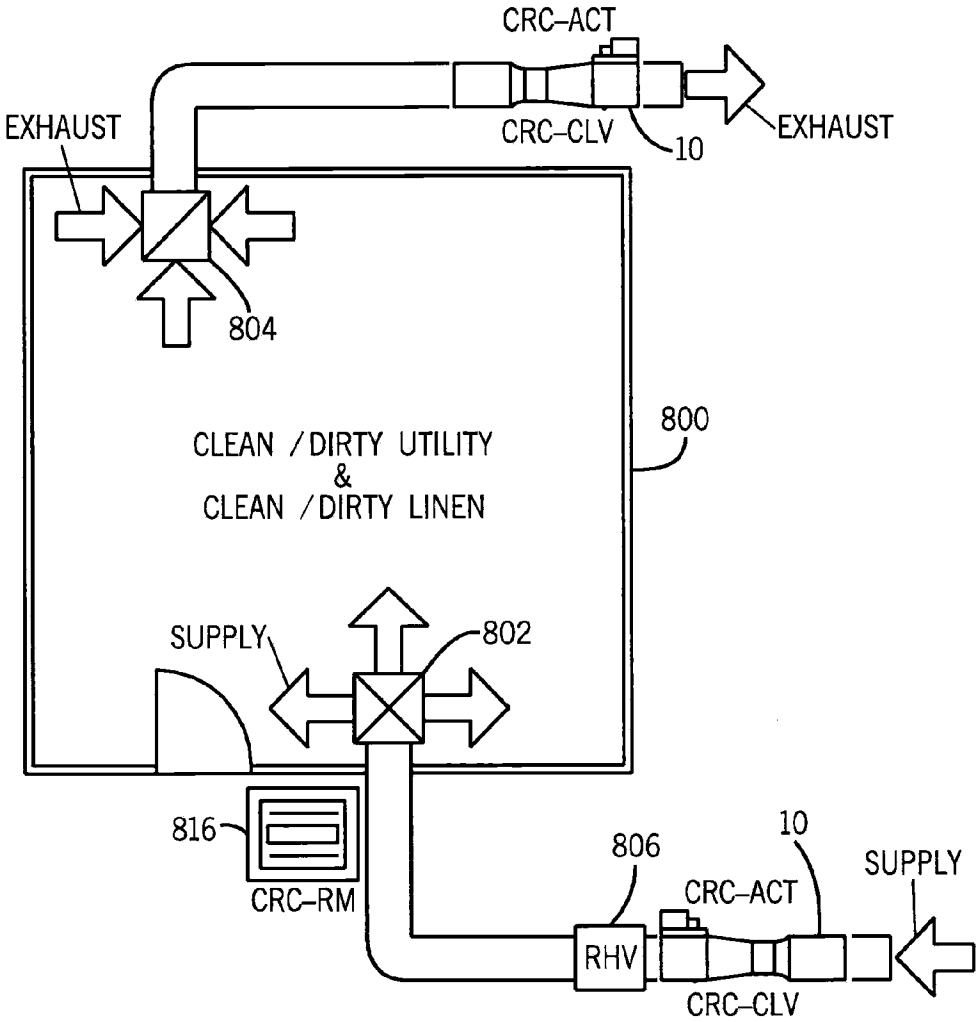
FIG. 12 is a schematic illustration of the venturi valve of FIG. 1 for use in a utility or linen room.
Figure 12:
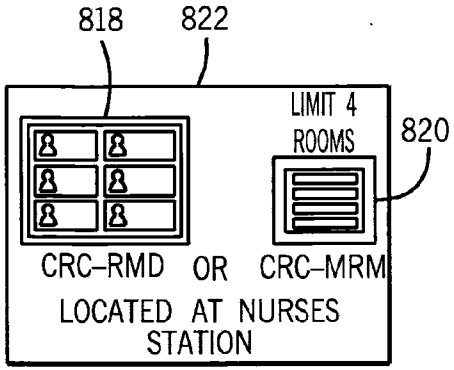

FIG. 12 is a schematic illustration of the venturi valve of FIG. 1 for use in a utility or linen room 800. The utility or linen room 800 includes a supply duct 802 and an exhaust duct 804. A first venturi valve 10 can be positioned in the supply duct 802 along with a reheat valve 806. A second venturi valve 10 can be positioned in the exhaust duct 804. The utility or linen room 800 can be equipped with a room monitor 816, which can be in communication with a room management display 818 or a multi-room monitor 820, for example located at a nurses' station 22.

Figure 13:
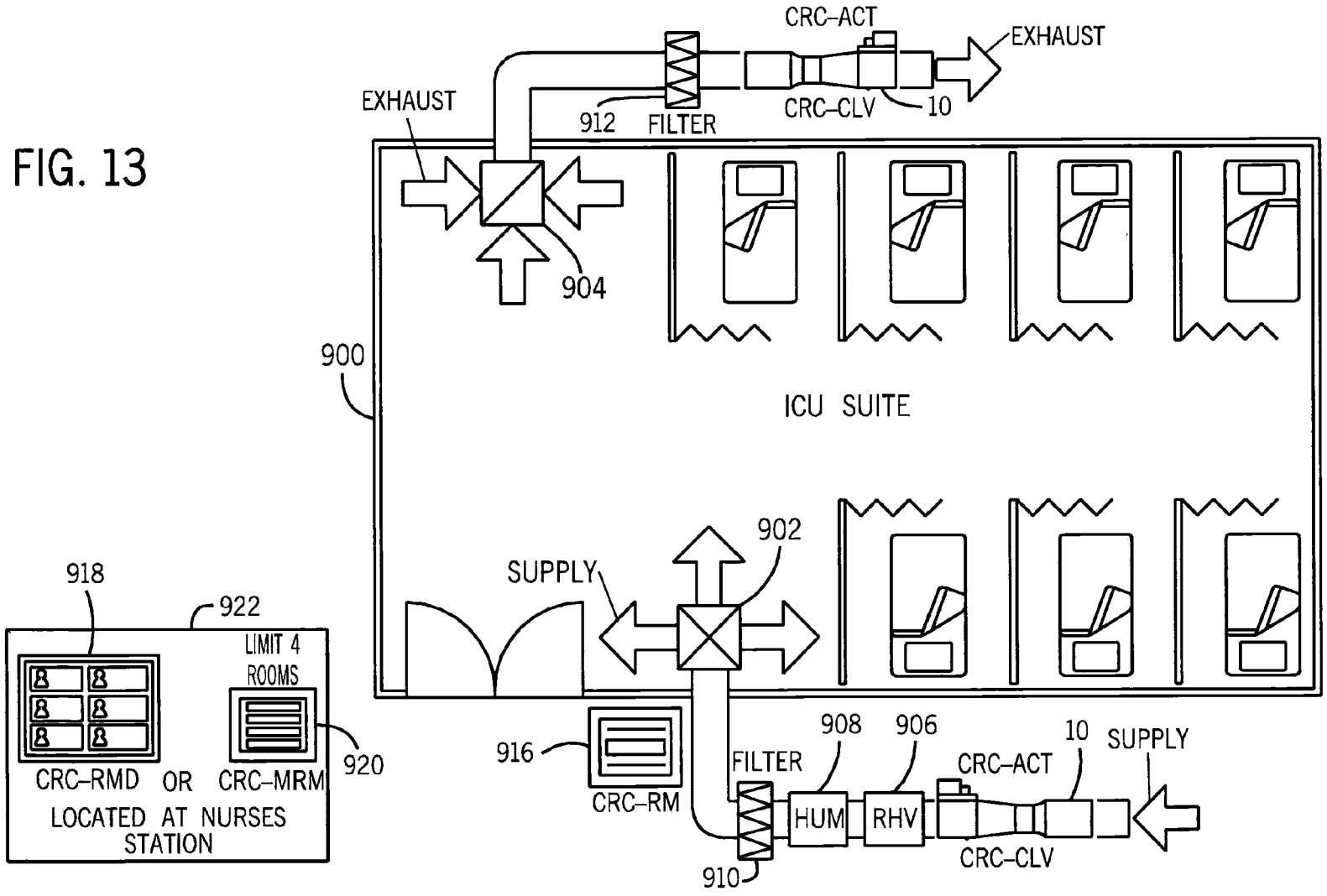
FIG. 13 is a schematic illustration of the venturi valve of FIG. 1 for use in an intensive care unit suite.

FIG. 13 is a schematic illustration of the venturi valve of FIG. 1 for use in an intensive care unit (ICU) suite 900. The ICU suite 900 includes a supply duct 902 and an exhaust duct 904. A first venturi valve 10 can be positioned in the supply duct 902 along with a reheat valve 906, a humidity sensor 908, and a first filter 910. A second venturi valve 10 can be positioned in the exhaust duct 904 along with a second filter 912. The ICU suite 900 can be equipped with a room monitor 916, which can be in communication with a room management display 918 or a multi-room monitor 920, for example located at a nurses' station 922.

Figure 14:
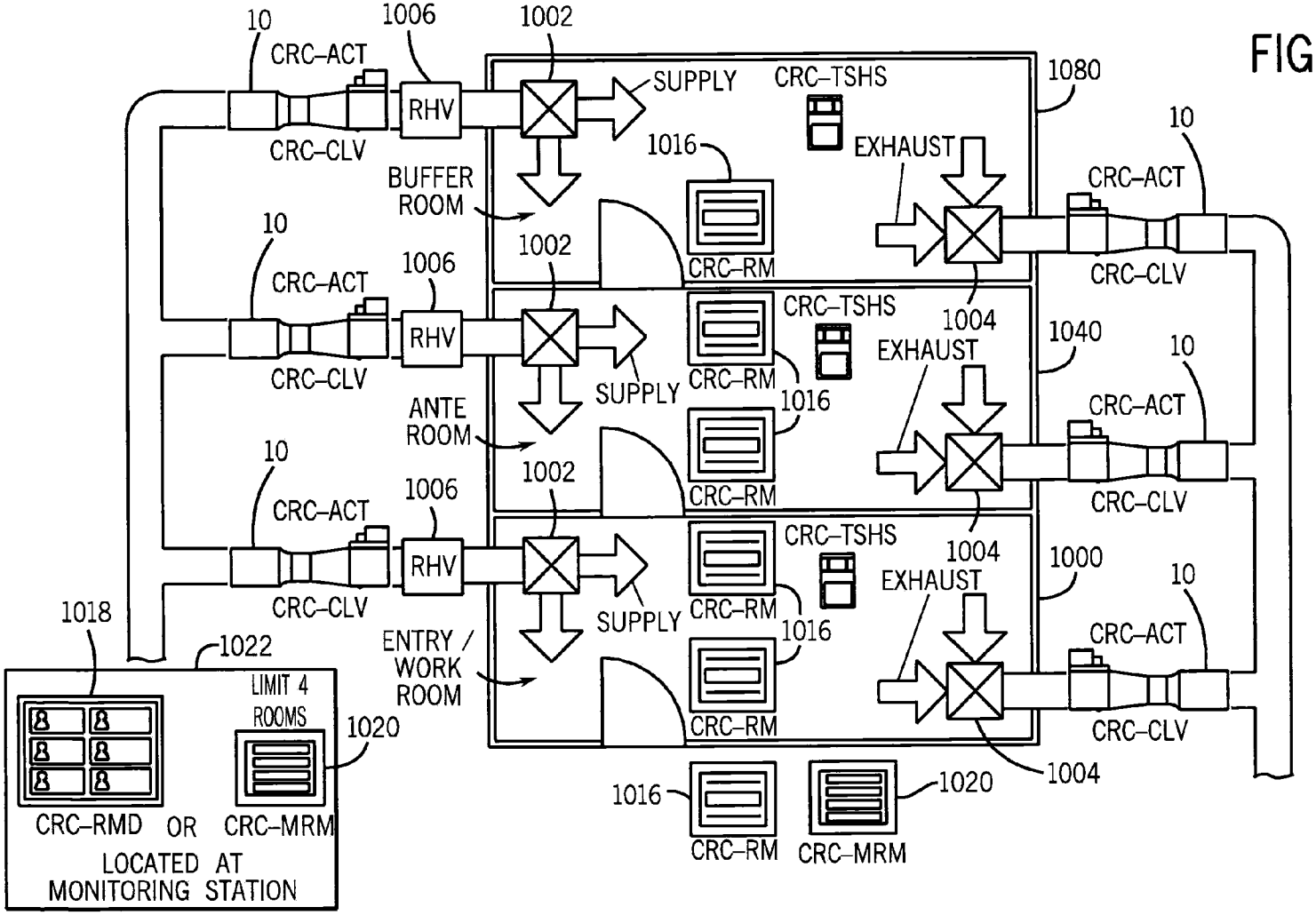
FIG. 14 is a schematic illustration of the venturi valve of FIG. 1 for use in a biosafety level laboratory or containment suite.

FIG. 14 is a schematic illustration of the venturi valve of FIG. 1 for use in a biosafety level laboratory (BSL) or containment suite with rooms 1000, 1040, 1080. The BSL rooms 1000, 1040, 1080 include supply ducts 1002 and exhaust ducts 1004. First venturi valves 10 can be positioned in the supply ducts 1002 along with reheat valves 1006. Second venturi valves 10 can be positioned in the exhaust ducts 1004. The BSL rooms 1000, 1040, 1080 can be equipped with room monitors 1016, which can be in communication with a room management display 1018 or multi-room monitors 1020, for example located at a monitoring station 1022.

Figure 15:
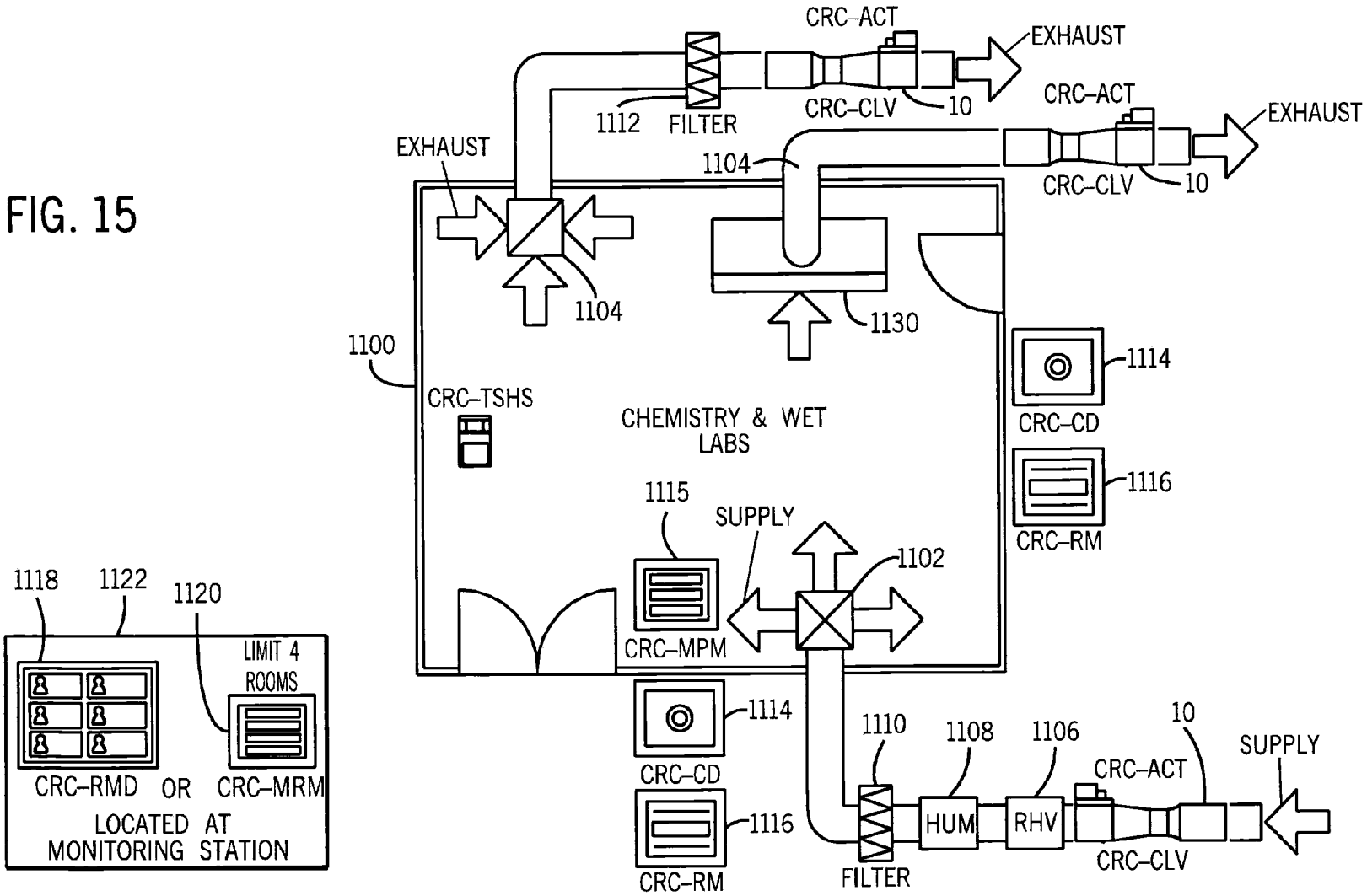
FIG. 15 is a schematic illustration of the venturi valve of FIG. 1 for use in a chemistry and wet laboratory.

FIG. 15 is a schematic illustration of the venturi valve of FIG. 1 for use in a chemistry and wet laboratory 1100. The laboratory 1100 includes a supply duct 1102 and an exhaust duct 1104. A first venturi valve 10 can be positioned in the supply duct 1102 along with a reheat valve 1006, a humidity sensor 1108, and a first filter 1110. A second venturi valve 10 can be positioned in the exhaust duct 1104 along with a second filter 1112. The laboratory 1100 can be equipped with room condition displays 1114, a multi-point monitor 1115, and room monitors 1116, which can be in communication with a room management display 1118 or a multi-room monitor 1120, for example located at a monitoring station 1122. The laboratory 1100 also includes a laboratory fume hood 1130, which is in communication with a third venturi valve 10 and a second exhaust duct 1104.

The laboratory fume hood 1130 is a ventilated enclosure where harmful materials can be handled safely. Access to the interior of the hood 1130 is through an opening, which is closed with a sash that typically slides up and down to vary the opening into the hood 1130. The velocity of the air flow through the hood opening is called the face velocity. The more hazardous the material being handled, the higher the recommended face velocity, and guidelines have been established relating face velocity to toxicity. Typical face velocities for laboratory fume hoods are 60 to 150 feet per minute (fpm), depending upon the application. When an operator is working in the hood 1130, the sash is opened to allow free access to the materials inside. The sash may be opened partially or fully, depending on the operations to be performed in the hood 1130. While fume hood and sash sizes vary, the opening provided by a fully opened sash is on the order of ten square feet. Thus, the maximum air flow which the blower must provide is typically on the order of 600 to 1500 cubic feet per minute (CFM). The sash is closed when the hood 1130 is not being used by an operator. It is common to store hazardous materials inside the hood 1130 when the hood 1130 is not in use, and a positive air flow must therefore be maintained to exhaust contaminants from such materials even when the hood is not in use and the sash is closed.

Figure 16:
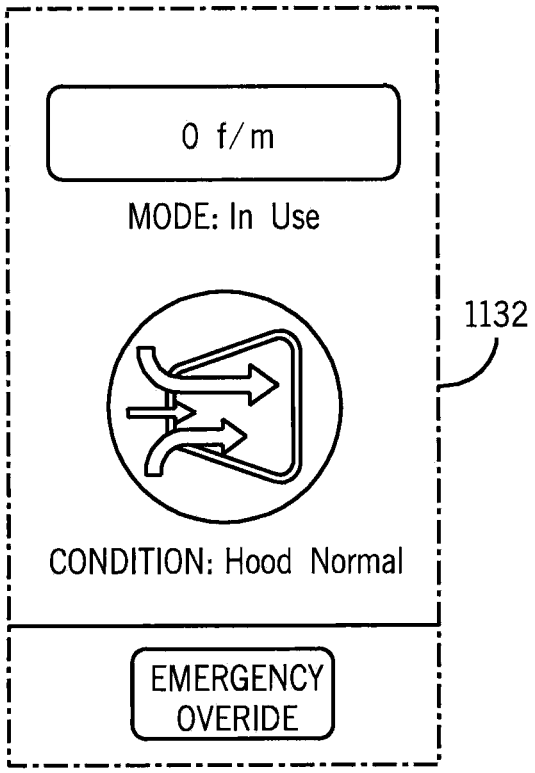
FIG. 16 is a schematic illustration of a fume hood controller for use with the venturi valve of FIG. 1.

The hood 1130 is connected to a fume hood controller 1132, according to some embodiments of the invention and as shown in FIG. 16, which can accurately monitor and/or control the ventilation of the fume where proper face velocity or air volume is necessary. The fume hood controller 1132 can be used to modulate the exhaust volume of the venturi valve 10 to maintain a constant face velocity (e.g., 500 CFM). The fume hood controller 1132 can be capable of standalone operation and both visual and audible alarms. The fume hood controller 1132 can be used in the following critical environments: wet chemistry, open bench, bio-containment laboratories, pharmacies, clean rooms, and animal research facilities. The fume hood controller 1132 provides several configurations, including variable volume, constant volume, and low volume. The fume hood controller 1132 can be configured for direct velocity control, vertical sash sensing, horizontal sash sensing, a combination of vertical and horizontal sash sensing, and constant volume sensing. The fume hood controller 1132 can support the venturi valve 10, exhaust air terminals, mechanical linear plunger valves, and variable frequency drives. The fume hood controller 1132 can incorporate a microprocessor-based controller with a full color touch screen interface and can be used as a monitor only or as a complete system controller. The fume hood controller 1132 includes analog inputs/outputs and communications in order to integrate with the venturi valve 10, along with the various controllers and monitors described herein, in addition to existing building automation systems.

The fume hood controller 1132 can allow the user to locally select from "IN USE" and "STANDBY" modes, and can include various energy saving features, such as night set back, occupancy set back, and sash user notification.

The fume hood controller 1132 can be capable of several different feedback configurations, including closed-loop volumetric constant face velocity control. The fume hood controller 1132 can measure the area of the fume hood opening (vertical sash, horizontal sash, or combination sash), including any fixed area with a bypass to determine total sash opening. The measured sash area can be used to proportionally control the hood's exhaust venturi valve 10 to maintain a constant average face velocity.

The fume hood controller 1132 control strategy can be a closed loop system that utilizes feedback to measure the actual system operating flow parameter. The feedback signal can be sent back to the controller where it is compared to the desired system set point. The fume hood controller 1132 can be capable of multiple set points including at least "IN USE", "STANDBY", "NIGHT", "UNOCCCUPIED", and "SHUT DOWN" modes. The fume hood controller 1132 can display the actual face velocity, time in current mode, sash open area, and CFM.

The fume hood controller 1132 can also operate according to open-loop with verification feedback for volumetric constant face velocity control. The fume hood controller 1132 can utilize linear valve position and control the position of the damper panel 36 of the venturi valve 10 to control flow.

In addition, the fume hood controller 1132 can operate according to direct velocity control. The fume hood controller 1132 can substantially continually measure the bi directional flow between the interior of the hood 1130 and the reference space. The fume hood controller 1132 can be capable of measuring a face velocity of 0-200 FPM (0-61 m/s). The fume hood controller 1132 can be capable of monitoring actual hood exhaust flow independent from control. The fume hood controller 1132 can measure flow from the closed loop exhaust valve or an air flow station.

Also, the fume hood controller 1132 can operate according to closed-loop constant flow and variable constant flow. The fume hood controller 1132 can maintain a constant or variable constant exhaust flow. The fume hood controller 1132 control strategy can be a closed loop system that utilizes feedback to measure the actual system operating flow parameter. The feedback signal can be sent back to the controller where it is compared to the desired system set point.

In addition, the fume hood controller 1132 can operate according to open-loop with verification constant flow and variable constant flow. The fume hood controller 1132 can maintain a constant or variable constant exhaust flow. The fume hood controller 1132 can utilize linear valve position and control the position of the damper panel 36 of the venturi valve 10 to control air flow. The valve 10 can include an integral air flow station for actual flow measurement feedback.

The fume hood controller 1132 can maintain the face velocity-volume set point to ensure fume hood containment. The actual velocity can be within ±10% of the set point within one second. The system can be capable of at least a 5:1 turndown. The fume hood controller 1132 can achieve 90% of volume within one second of the sash reaching 90% of its final position.

The fume hood controller 1132 can have multiple modes with each mode being capable of local configuration via touch screen or remote configuration via a network connection. The fume hood controller 1132 can include automated sequences and timing features for energy savings. The mode and condition of the space can be chosen with a single user change and not require the user to make changes to multiple parameters. The fume hood controller 1132 can display the time the hood 1130 is in each mode, including normal or alarm conditions.

For each of the feedback configurations described above, the fume hood controller 1132 can display the hood status/condition in a number of different manners. One hood status is "In Use (No Alarm)" in which the fume hood controller 1132 can display a green screen with hood air flow graphic and no audible alarm. The fume hood controller 1132 can display current FPM or m/s. Another hood status is "In Use (Loss of face velocity inside alarm delay)" in which the fume hood controller 1132 can display a green screen with a caution graphic and can flash an additional message indicating the hood 1132 is not maintaining air flow and prompt the user to close the sash. Another hood status is "In Use (Loss of face velocity Alarm)" in which the fume hood controller 1132 can display a red screen with an alarm graphic and flash an additional message indicating the hood 1130 is not maintaining air flow and prompt the user to close the sash. Yet another hood status is "Standby/Night Alert/Occupancy Alert" in which the fume hood controller 1132 can display a blue screen with a standby graphic. In all modes, when the fume hood controller 1132 screen is touched, it can display the following information: time hood has been in current mode, sash open area, and CFM/l/s.

For each of the feedback configurations described above, the fume hood controller 1132 can be capable of supporting multiple hood control strategies and associated set points. The fume hood controller 1132 can have several constant face velocity set points, for example, including the following: "In Use (normal operation)"; "Standby (unoccupied and night set back)"; "Emergency Override (maximum flow)"; "In Use set point XXX FPM (m/s)"; and "Standby/Night/Unoccupied set point XXX FPM (m/s)".

The fume hood controller 1132 can include an emergency override button clearly indicated on the touch screen interface. The emergency override can have a dedicated audible and graphic alarm when activated. The emergency override can drive the exhaust to maximum flow. The emergency override can be initiated from the fume hood controller 1132 or remotely from a contact or network. A user can locally mute the emergency override of the fume hood controller 1132 from the touch screen. The audible alarms can be silenced via a network.

The fume hood controller 1132 can also provide safe energy sash alerts for hoods with sash sensors. In some embodiments, the fume hood controller 1132 can be capable of activating an alarm based on a light level sensor and a hood open sash area. In other embodiments, the fume hood controller 1132 can be capable of activating an alarm based on occupancy and hood open sash area. The FHC shall clearly display the sash alarm status on the touch screen. The fume hood controller 1132 can substantially continually monitor the sash open area. The fume hood controller 1132 can alarm if the hood face opening is greater than a particular square footage. The alarm can have a configurable time delay and can be reset when the hood open area is lowered below opening threshold.

The fume hood controller 1132 can have an RS-485 serial network interface that supports native BACnet MS/TP. The fume hood controller 1132 can also support Modbus, N2 and Lon with optional card.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A venturi valve for use in an indoor critical environment to regulate [air] *fluid* flow, the venturi valve positioned in an exhaust a duct, the venturi valve comprising:

a [substantially cylindrical pipe] *tube* including at least a first section having a first [diameter] *perimeter* and a second section having a second [diameter] *perimeter*, the first [diameter] *perimeter* being larger than the second [diameter] *perimeter*, wherein the first section is coupled to the second section by a third section that is defined by a reducing [diameter] *perimeter*;

a high pressure sensing assembly including a first pneumatic tube positioned around the first [diameter] *perimeter*, the first pneumatic tube coupled to [a] *at least two* first [plurality of air] *fluid* inlet ports, the *at least two* first [plurality of air] *fluid* inlet ports [spaced around] *located in* the first [diameter] *perimeter* to sense a first average static pressure at the first [diameter] *perimeter*;

a low pressure sensing assembly including [a second pneumatic tube positioned around the second diameter, the second pneumatic tube coupled to a] *at least two* second [plurality of air] *fluid* inlet ports, the *at least two* second [plurality of air] *fluid* inlet ports [spaced around] *located in* the second [diameter] *perimeter* to sense a second average static pressure at the second [diameter] *perimeter*;

a differential pressure transducer coupled to the high pressure sensing assembly and the low pressure sensing assembly, the differential pressure transducer generating a differential pressure signal based on the first average static pressure and the second average static pressure;

a damper assembly coupled to the [substantially cylindrical pipe] *tube*, the damper assembly including a damper and a damper actuator *device*; and a controller connected to the differential pressure transducer and the damper actuator *device*, *wherein* the controller determining a current flow rate of [air] *fluid* into the indoor critical environment based on the differential pressure signal, the controller operating the damper actuator *device* based on the current flow rate in order to provide a desired flow rate of [air] *fluid* out of the indoor critical environment until the indoor critical environment is cleared through the exhaust duct and a pressure of the indoor critical environment *is one of negative*, neutral *and positive* relative to adjacent spaces.

[2. The valve of claim 1 wherein at least one of the first plurality of air inlet ports and the second plurality of air inlet ports each include at least six equally spaced inlet ports.]

3. The valve of claim 1 wherein at least one of the *at least two* first [plurality of air] *fluid* inlet ports and the *at least two* second [plurality of air] *fluid* inlet ports are coupled to an internal surface of the [substantially cylindrical pipe] *tube* in order to be surface flush.

4. The valve of claim 1 wherein at least one of the *at least two* first [plurality of air] *fluid* inlet ports and the *at least two* second [plurality of air] fluid inlet ports minimally extend into an internal portion of the [substantially cylindrical pipe] *duct*.

5. The valve of claim 1 wherein at least one of the *at least two* first [plurality of air] *fluid* inlet ports and the *at least two* second [plurality of air] *fluid* inlet ports do not bisect the [substantially cylindrical pipe] *tube*.

6. The valve of claim 1 wherein at least one of the *at least two* first [plurality of air] *fluid* inlet ports and the *at least two* second [plurality of air] *fluid* inlet ports do not substantially impede air flow through the [substantially cylindrical pipe] *tube*.

7. The valve of claim 1 wherein at least one of the *at least two* first [plurality of air] *fluid* inlet ports and the *at least two* second [plurality of air] *fluid* inlet ports extend up to about two inches into an internal portion of the [substantially cylindrical pipe] *tube*.

8. The valve of claim 1 wherein the indoor environment includes at least one of a health care facility, a patient room, an isolation room, a procedure room, a pharmacy, an oncology room, a laboratory, an operating room, a research facility, a wet chemistry laboratory, a bio-containment room, a clean room, a life science facility, a vivarium, and an open bench laboratory.

[9. The valve of claim 1 wherein the venturi valve is used for one of supply air flow, exhaust air flow, hood air flow, return air flow, and bypass air flow.]

10. The valve of claim 1 and further comprising a cover surrounding the differential pressure transducer, the high pressure sensing assembly, and the low pressure sensing assembly.

11. The valve of claim 1 and further comprising an actuator mounting bracket coupled to the [substantially cylindrical pipe] *tube*, the damper, and the damper actuator *device*.

12. The valve of claim 1, wherein the first section and the second section each have substantially constant [diameters] *perimeters* along a length thereof.

13. The valve of claim 12, wherein the [substantially cylindrical pipe] *tube* further includes a fourth section having an increasing *diameter perimeter*, and a fifth section having a [diameter] *perimeter* substantially equal to the first section, and wherein the fourth section is disposed between the second section and the fifth section.

*14. A venturi valve for use in an indoor critical environment to regulate fluid flow, the venturi valve positioned in an exhaust a duct, the venturi valve comprising:*

*a tube including at least a first section having a first perimeter and a second section having a second perimeter, the first perimeter being larger than the second perimeter, wherein the first section is coupled to the second section by a third section that is defined by a reducing perimeter;*

*a high pressure sensing assembly including at least two first fluid inlet ports, the at least two first fluid inlet ports located in the first perimeter to sense a first average static pressure at the first perimeter, said first perimeter having a first constant perimeter portion along a longitudinal axis of said venture valve, said high pressure sensing assembly being located in said first constant perimeter portion;*

*a low pressure sensing assembly including at least two second fluid inlet ports, the at least two second fluid inlet ports located in the second perimeter to sense a second average static pressure at the second perimeter, said second perimeter having a second constant perimeter portion along a longitudinal axis of said venture valve, said low pressure sensing assembly being located in said second constant perimeter portion;*

*a differential pressure transducer coupled to the high pressure sensing assembly and the low pressure sensing assembly, the differential pressure transducer generating a differential pressure signal based on the first average static pressure and the second average static pressure;*

*a damper assembly coupled to the tube, the damper assembly including a damper and a damper actuator device; and*

*a controller connected to the differential pressure transducer and the damper actuator device, wherein the controller determining a current flow rate of fluid into the indoor critical environment based on the differential pressure signal, the controller operating the damper actuator device based on the current flow rate in order to provide a desired flow rate of fluid out of the indoor critical environment until the indoor critical environment is cleared through the exhaust duct and a pressure of the indoor critical environment is one of negative, neutral and positive relative to adjacent spaces.*

*15. The valve of claim 14 wherein at least one of the at least two first fluid inlet ports and the at least two second fluid inlet ports extend up to about two inches into an internal portion of the tube.*

* * * * *